(12) United States Patent
Zou (10) Patent No.: US 12,301,303 B2
(45) Date of Patent: May 13, 2025

(54) DATA TRANSMISSION METHODS, ELECTRONIC TAG AND ELECTRONIC DEVICE

(71) Applicant: BOE TECHNOLOGY GROUP CO., LTD., Beijing (CN)

(72) Inventor: Xiangxiang Zou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 410 days.

(21) Appl. No.: 17/760,727

(22) PCT Filed: Mar. 11, 2021

(86) PCT No.: PCT/CN2021/080312
§ 371 (c)(1),
(2) Date: Mar. 15, 2022

(87) PCT Pub. No.: WO2021/180187
PCT Pub. Date: Sep. 16, 2021

(65) Prior Publication Data
US 2022/0376741 A1   Nov. 24, 2022

(30) Foreign Application Priority Data
Mar. 12, 2020   (CN) .......................... 202010170524.0

(51) Int. Cl.
*H04B 5/70*   (2024.01)
(52) U.S. Cl.
CPC ..................... *H04B 5/70* (2024.01)
(58) Field of Classification Search
CPC ........ H04B 5/70; H04W 4/80; H04W 12/106; H04L 1/0061; H04L 1/16

USPC ........................................................ 455/41.1
See application file for complete search history.

(56) References Cited

U.S. PATENT DOCUMENTS

| | | | |
|---|---|---|---|
| 2013/0195210 A1* | 8/2013 | Swarbrick | G06F 13/423 |
| | | | 375/259 |
| 2014/0126468 A1 | 5/2014 | Filgueiras et al. | |
| 2018/0075446 A1 | 3/2018 | Yin et al. | |
| 2018/0324892 A1 | 11/2018 | Jeon | |

(Continued)

FOREIGN PATENT DOCUMENTS

| | | |
|---|---|---|
| CN | 101217295 A | 7/2008 |
| CN | 106302808 A | 1/2017 |

(Continued)

OTHER PUBLICATIONS

Second Office Action for the Chinese Patent Application No. 202010170524.0 issued by the Chinese Patent Office on May 26, 2023.

(Continued)

*Primary Examiner* — Eugene Yun
(74) *Attorney, Agent, or Firm* — XSENSUS LLP (57) ABSTRACT

A data transmission method includes: establishing a near field communication connection with a terminal; in a process of receiving data sent by the terminal, monitoring a time interval between a time when the near field communication connection with the terminal is interrupted and a time when the near field communication connection with the terminal is restored; and if the time interval is greater than or equal to a breakpoint resuming time threshold, sending a data retransmission instruction to the terminal.

13 Claims, 7 Drawing Sheets

(56) References Cited

U.S. PATENT DOCUMENTS

2020/0137203 A1    4/2020  Zhou et al.
2022/0353349 A1*  11/2022  Qian ...................... H04L 67/12

FOREIGN PATENT DOCUMENTS

| CN | 108880744 A | 11/2018 |
| CN | 109217978 A | 1/2019 |
| CN | 110213024 A | 9/2019 |
| CN | 110728159 A | 1/2020 |
| CN | 111356119 A | 6/2020 |

OTHER PUBLICATIONS

The First Office Action of Priority Application No. CN 202010170524.0 issued by the Chinese Patent Office on Sep. 5, 2022.

* cited by examiner

DATA TRANSMISSION METHODS, ELECTRONIC TAG AND ELECTRONIC DEVICE

CROSS-REFERENCE TO RELATED APPLICATIONS

This application is a national phase entry under 35 USC 371 of International Patent Application No. PCT/CN2021/080312 filed on Mar. 11, 2021, which claims priority to Chinese Patent Application No. 202010170524.0, filed on Mar. 12, 2020, which are incorporated herein by reference in their entirety.

TECHNICAL FIELD

The present disclosure relates to the field of data transmission technologies, and in particular, to data transmission methods and related devices.

BACKGROUND

Terminals such as mobile phones or readers can transmit data with an electronic tag through near field communication technology. For example, data in the terminals can be transmitted to the electronic tag, so that the electronic tag displays content corresponding to the transmitted data.

SUMMARY

In one aspect, a data transmission method applied to an electronic tag is provided. The data transmission method includes: establishing a near field communication connection with a terminal; monitoring a time interval between a time when the near field communication connection with the terminal is interrupted and a time when the near field communication connection with the terminal is restored in a process of receiving data sent by the terminal; and if the time interval is greater than or equal to a breakpoint resuming time threshold, sending a data retransmission instruction to the terminal.

In some embodiments, if the time interval is greater than or equal to the breakpoint resuming time threshold, sending the data retransmission instruction to the terminal, includes: if the time interval is greater than or equal to the breakpoint resuming time threshold, clearing a portion, having been received so far, of the data from the terminal, and sending the data retransmission instruction to the terminal to instruct the terminal to resend the whole data.

In some embodiments, after establishing the near field communication connection with the terminal, the method further includes: monitoring a voltage of a super capacitor of the electronic tag; and if the voltage of the super capacitor is greater than or equal to a first voltage threshold, sending a data transmission instruction to the terminal.

In some embodiments, after establishing the near field communication connection with the terminal, the method further includes: receiving the data sent by the terminal, wherein the data includes a plurality of data packets, each data packet includes a data information code and an information check code, and the information check code is calculated by the terminal according to the data information code; calculating a pending check code corresponding to the data information code of each data packet, and determining whether the pending check code is consistent with the information check code; and if not, returning a message indicating a transmission failure of the data packet to the terminal; and if so, return a message indicating a transmission success of the data packet to the terminal.

In some embodiments, each data packet further includes a packet number check code. After receiving the data sent by the terminal, the method further includes: determining whether the received data is complete according to the packet number check code; if not, sending a data retransmission instruction to the terminal; and if so, sending a data update instruction to a display device of the electronic tag.

In some embodiments, after establishing the near field communication connection with the terminal, the method further includes: receiving the data sent by the terminal, wherein the data includes a plurality of data packets, and each data packet includes a packet number check code; determining whether the received data is complete according to the packet number check code; if not, sending the data retransmission instruction to the terminal; and if so, sending a data update instruction to a display device of the electronic tag.

In some embodiments, the packet number check code includes a total number of data packets. Determining whether the received data is complete according to the packet number check code, includes: calculating a total number of all received data pockets; determining whether the total number of the all received data is consistent with the total number of the data packets of the packet number check code; if not, determining that the received data is incomplete; and if so, determining that the received data is complete.

In some embodiments, the packet number check code includes an identifier of the data packet. Determining whether the received data is complete according to the packet number check code, includes: determining whether identifiers of received data packets include an identifier of at least one of a first data packet or a last data packet; if the identifiers of received data packets do not include the identifier of the at least one of the first data packet or the last data packet, determining that the received data is incomplete; and if the identifiers of received data packets include the identifier of the at least one of the first data packet or the last data packet, determining that the received data is complete.

In some embodiments, determining whether the identifiers of the received data packets include the identifier of the first data packet and/or the identifier of the last data packet; if not, determining that the received data is incomplete; and if so, determining that the received data is complete, includes: determining whether an identifier of a data packet received last is the identifier of the first data packet; if not, determining that the received data is incomplete; and if so, determining that the received data is complete.

In some embodiments, the packet number check code includes an identifier of the data packet. Determining whether the received data is complete according to the packet number check code; if not, sending the data retransmission instruction to the terminal; and if so, sending the data update instruction to the display device of the electronic tag, includes: traversing identifiers of all received data packets to determine whether an identifier of a data packet is missing; if not, sending the data update instruction to the display device of the electronic tag; and if so, sending the data retransmission instruction carrying the identifier of the missing data packet to the terminal.

In some embodiments, sending the data update instruction to the display device of the electronic tag, includes: monitoring an voltage of a super capacitor of the electronic tag; and if the voltage of the super capacitor is greater than or equal to a second voltage threshold, sending the data update instruction to the display device of the electronic tag.

In another aspect, another data transmission method applied to a terminal is provided. The data transmission method includes: establishing a near field communication connection with an electronic tag; receiving a data retransmission instruction sent by the electronic tag in a process of sending data to the electronic tag; and resending the data.

In some embodiments, resending the data, includes: resending data packets starting from a data packet that has been sent first.

In some embodiments, the data transmission method further includes: if a message indicating a transmission failure of a data packet returned by the electronic tag is received, parsing the message to obtain an identifier of the data packet failed to be transmitted, and resending the data packet that failed to be transmitted to the electronic tag; if a message indicating a transmission success of a data packet returned by the electronic tag is received, parsing the message to obtain an identifier of the data packet that has been transmitted successfully, and sending a next data packet to the electronic tag; and if the data retransmission instruction carrying an identifier of at least one missing data packet sent by the electronic tag is received, parsing the data retransmission instruction to obtain the identifier of the at least one missing data packet, and sending the at least one missing data packet to the electronic tag.

In still another aspect, an electronic tag is provided. The electronic tag includes a display device, a communication device and a processor. The communication device is configured to establish a near field communication connection with a terminal. The processor is configured to: monitor a time interval between a time when the near field communication connection with the terminal is interrupted and a time when the near field communication connection with the terminal is restored in a process of receiving data sent by the terminal, and send a data retransmission instruction to the terminal if the time interval is greater than or equal to a breakpoint resuming time threshold.

In still another aspect, a data transmission device disposed in a terminal is provided. The data transmission device includes a communication module, a receiving module and a sending module. The communication module is configured to establish a near field communication connection with an electronic tag. The receiving module is configured to receive a data retransmission instruction sent by the electronic tag in a process of sending data to the electronic tag. The sending module is configured to resend the data.

In still another aspect, an electronic device is provided. The electronic device includes a memory, a processor and a computer program stored and executable on the processor. The method described in any one of the above embodiments is implemented when the computer program is executed by the processor.

In still another aspect, a non-transitory computer-readable storage medium is provided. The computer-readable storage medium has stored computer program instructions. When the computer program instructions are executed by a processor, the processor performs the method in any one of the above embodiments.

In still another aspect, a computer program product is provided. The computer program product includes computer program instructions. When run on a computer, the computer program instructions cause the computer to perform the method in any one of the above embodiments.

In still another aspect, a computer program is provided. When run on a computer, the computer program causes the computer to perform the method in any one of the above embodiments.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art can obtain other drawings according to these accompanying drawings. In addition, the accompanying drawings in the following description may be regarded as schematic diagrams, but are not limitations on an actual size of a product, an actual process of a method and an actual timing of a signal involved in the embodiments of the present disclosure.

DETAILED DESCRIPTION

Technical solutions in some embodiments of the present disclosure will be described clearly and completely below with reference to the accompanying drawings. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representation of the above terms does not necessarily refer to the same embodiment(s) or examples(s). In addition, the specific features, structures, materials or characteristics may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, the features defined by "first" and "second" may explicitly or implicitly include one or more of the features. In the description of the embodiments of the present disclosure, the term "a plurality of/the plurality of" means two or more unless otherwise specified.

Some embodiments may be described using the expressions "coupled" and "connected" along with their derivatives. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is optionally construed as "when" or "in a case where" or "in response to determining that" or "in response to detecting" depending on the context. Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

The use of the phrase "applicable to" or "configured to" herein means an open and inclusive language, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

After a near field communication connection between a terminal (such as a mobile phone or a reader) and an electronic tag, data transmission may be performed. If the near field communication connection is interrupted during the data transmission, and an interruption duration exceeds a breakpoint resuming time threshold (i.e., a preset interval time for breakpoint resuming), data in the electronic tag that have been received will be cleared. Then, when the terminal approaches the electronic tag again to establish the near field communication connection, the terminal does not resend data packets starting from a data packet that has been sent first, but continue to transmit data packets next to the data packet(s) that has been sent previously. As a result, it will easily cause the electronic tag to lose data packet(s) transmitted before the interruption. In this case, display content of the electronic tag is prone to garbled characters. Moreover, in most cases, the longer the data transmission time before the interruption is, the larger an area of a display where no image is displayed is.

Figure 1:
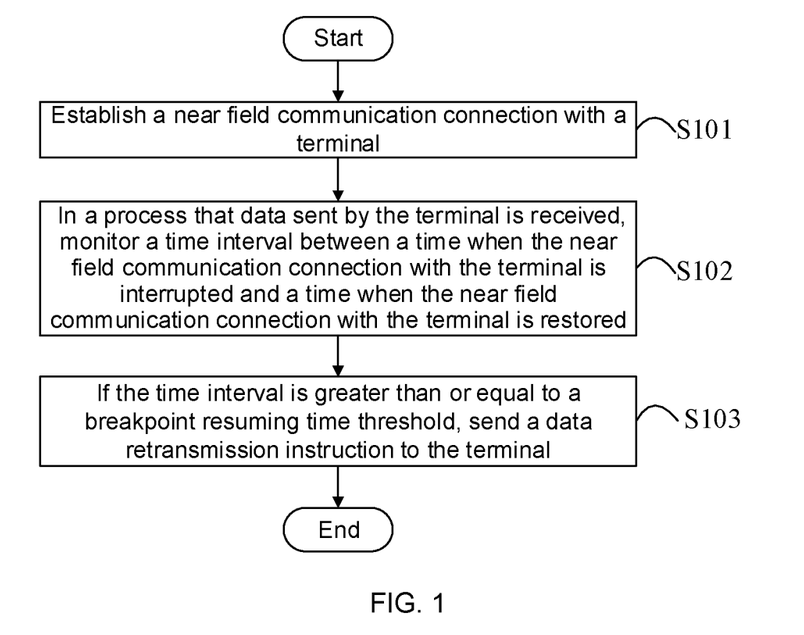
FIG. 1 is a flowchart of a data transmission method, in accordance with some embodiments.

Base on this, some embodiments of the present disclosure provide a data transmission method applied to an electronic tag. As shown in FIG. 1, the method includes the following steps 101 to 103 (S101 to S103).

In S101, a near field communication connection is established with a terminal.

Figure 2:
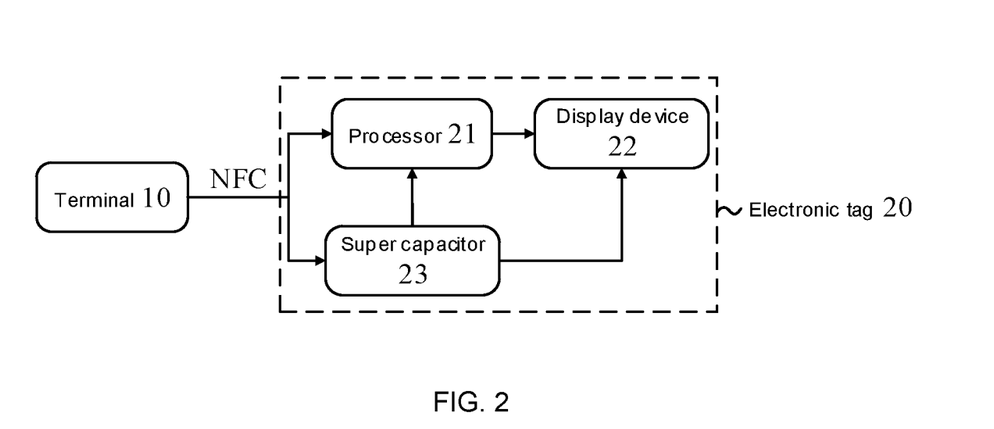
FIG. 2 is a schematic block diagram of a terminal and an electronic tag, in accordance with some embodiments.

In some examples, the electronic tag establishes the near field communication connection with the terminal having a near field communication (NFC) function (such as a mobile phone or a reader). As shown in FIG. 2, the electronic tag 20 may include a processor 21, a display device 22, a super capacitor 23, etc.

The processor 21 may be, for example, an execution unit having an information processing function and a program running function, such as a microcontroller unit (MCU). The display device 22 may be, for example, a display with a display function, such as an electrophoretic display (EPD).

The terminal 10 may charge the super capacitor 23, and transmit data to the MCU through NFC technology. After the data is written into the MCU, an information update instruction may be sent to the EPD.

For example, after the near field communication connection is established between the electronic tag 20 and the terminal 10, the terminal 10 charges the super capacitor 23, and the electronic tag 20 monitors a voltage of the super capacitor 23 in real time. If the voltage of the super capacitor 23 is greater than or equal to a first voltage threshold, the electronic tag 20 sends a data transmission instruction to the terminal 10, so that the terminal 10 starts to send data to the electronic tag 20.

In S102, in a process that the data sent by the terminal 10 is received, a time interval between a time when the near field communication connection with the terminal 10 is interrupted and a time when the near field communication connection with the terminal 10 is restored is monitored.

After the near field communication connection between the electronic tag 20 and the terminal 10 is established, the terminal 10 sends the data to the electronic tag 20. In the process of receiving the data sent by the terminal 10, the electronic tag 20 monitors in real time whether the near field communication connection with the terminal 10 is interrupted. If the near field communication connection is interrupted, the electronic tag 20 records an interruption time node $t_0$. When the near field communication connection between the electronic tag 20 and the terminal 10 is restored, the electronic tag 20 records a restoration time node $t_1$. The electronic tag 20 calculates the time interval $\Delta t$ between the time (i.e., the interruption time node $t_0$) when the near field communication connection with the terminal 10 is interrupted and the time (i.e., the restoration time node $t_1$) when the near field communication connection with the terminal 10 is restored. The time interval $\Delta t$ satisfies: $\Delta t = t_1 - t_0$.

In S103, if the time interval is greater than or equal to a breakpoint resuming time threshold, a data retransmission instruction is sent to the terminal 10.

If the time interval $\Delta t$ between the time when the near field communication connection with the terminal 10 is interrupted and the time when the near field communication connection with the terminal 10 is restored satisfies: $\Delta t = t_1 - t_0 \geq T_{timeout}$ (where $T_{timeout}$ is a preset interval time for breakpoint resuming, that is, the breakpoint resuming time threshold), the electronic tag 20 sends the data retransmission instruction to the terminal 10, so that the terminal 10 resends the data starting from a data packet that has been sent first after receiving the data retransmission instruction.

In addition, before the data retransmission instruction is sent, the received data may be cleared or not be cleared, which is not limited in embodiments of the present disclosure.

It will be noted that, in a case where the data is sent, for example, in a form of data packets, after receiving the whole data sent by the terminal 10, the electronic tag 20 may, for example, delete duplicate data packet(s) in received data packets. In this way, interferences of the duplicate data packet(s) in display of the electronic tag 20 may be avoided, which is beneficial to normal display of the electronic tag 20.

In the data transmission method provided in some embodiments of the present disclosure, in a case where an interruption duration (i.e., the time interval Δt) exceeds the breakpoint resuming time threshold, the electronic tag 20 sends the retransmission instruction to the terminal 10, so that the terminal 10 resends the data starting from the data packet that has been sent first after receiving the data retransmission instruction. In this way, it may be possible for the electronic tag 20 to effectively avoid missing data packet(s) transmitted before the interruption, so that the transmitted data may be ensured to be complete and accurate, which effectively avoids garbled characters in display content of the electronic tag 20.

Figure 3:
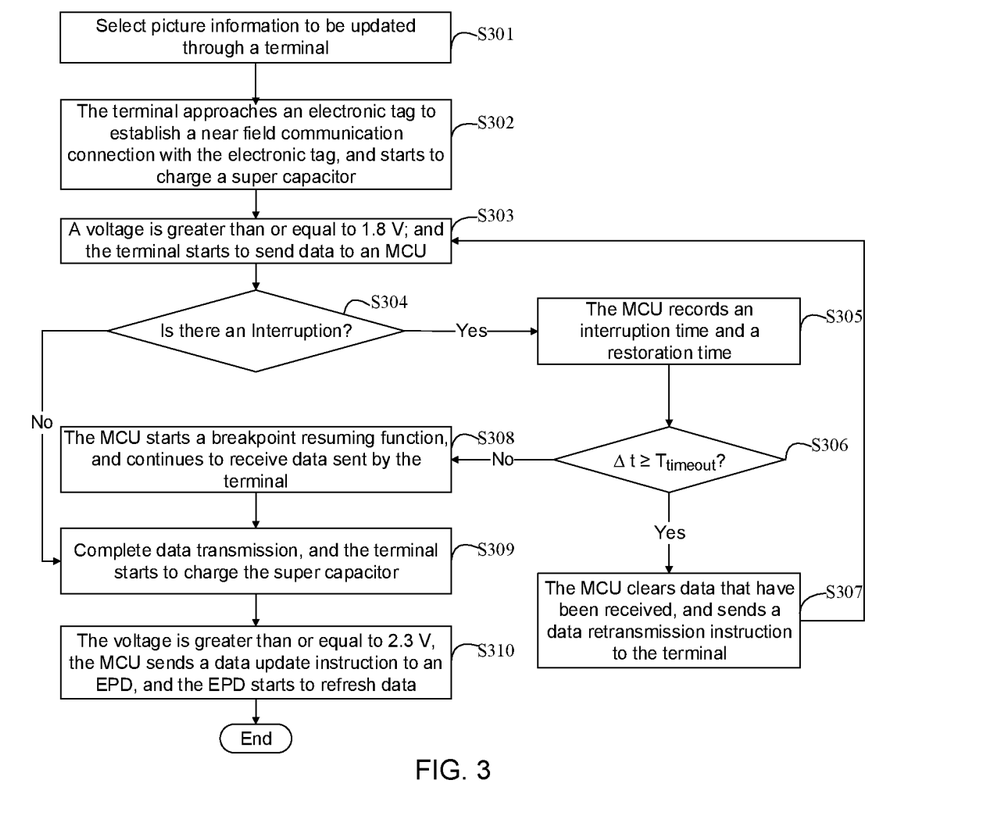
FIG. 3 is a flowchart of another data transmission method, in accordance with some embodiments.

In some embodiments of the present disclosure, as shown in FIGS. 2 and 3, the data transmission method may include the following steps 301 to 310 (S301 to S310).

In S301, picture information to be updated is selected through the terminal 10.

In S302, the terminal 10 approaches the electronic tag 20 to establish a near field communication connection with the electronic tag 20, and starts to charge the super capacitor 23.

In S303, the super capacitor 23 is charged, and a voltage of the super capacitor 23 is greater than or equal to 1.8 V; and the terminal 10 starts to send data to the MCU.

In S304, the MCU determines whether the near field communication connection with the terminal 10 is interrupted; if so, S305 is performed; and if not, S309 is performed.

In S305, the MCU records an interruption time node t0; when the near field communication connection between the electronic tag 20 and the terminal 10 is restored, the MCU records a restoration time node t1, and calculates a time interval Δt between a time when the near field communication connection between the electronic tag 20 and the terminal 10 is interrupted and a time when the near field communication connection between the electronic tag 20 and the terminal 10 is restored. The time interval Δt satisfies: $\Delta t = t_1 - t_0$.

In S306, the MCU determines whether the time interval Δt is greater than or equal to $T_{timeout}$ (where $T_{timeout}$ is a preset interval of breakpoint resuming); if so, S307 is performed; if not, S308 is performed.

In S307, the MCU clears data that have been received, and sends a data retransmission instruction to the terminal 10.

In S308, the MCU starts a breakpoint resuming function, and continues to receive data sent by the terminal 10. The terminal 10 continues to send the data in a current state, so that time for transmitting data may be reduced.

In S309, data transmission is completed; and the terminal 10 continues to charge the super capacitor 23.

In S310, the charging of the super capacitor 23 is completed, and the voltage of the super capacitor 23 is greater than or equal to 2.3 V; the MCU sends a data update instruction to the EPD; and the EPD starts to refresh data.

Some embodiments of the present disclosure provide another data transmission method. As shown FIGS. 2 and 4, the data transmission method is applied to the electronic tag 20; and the method includes the following steps 401 to 407 (S401 to S407).

Figure 4:
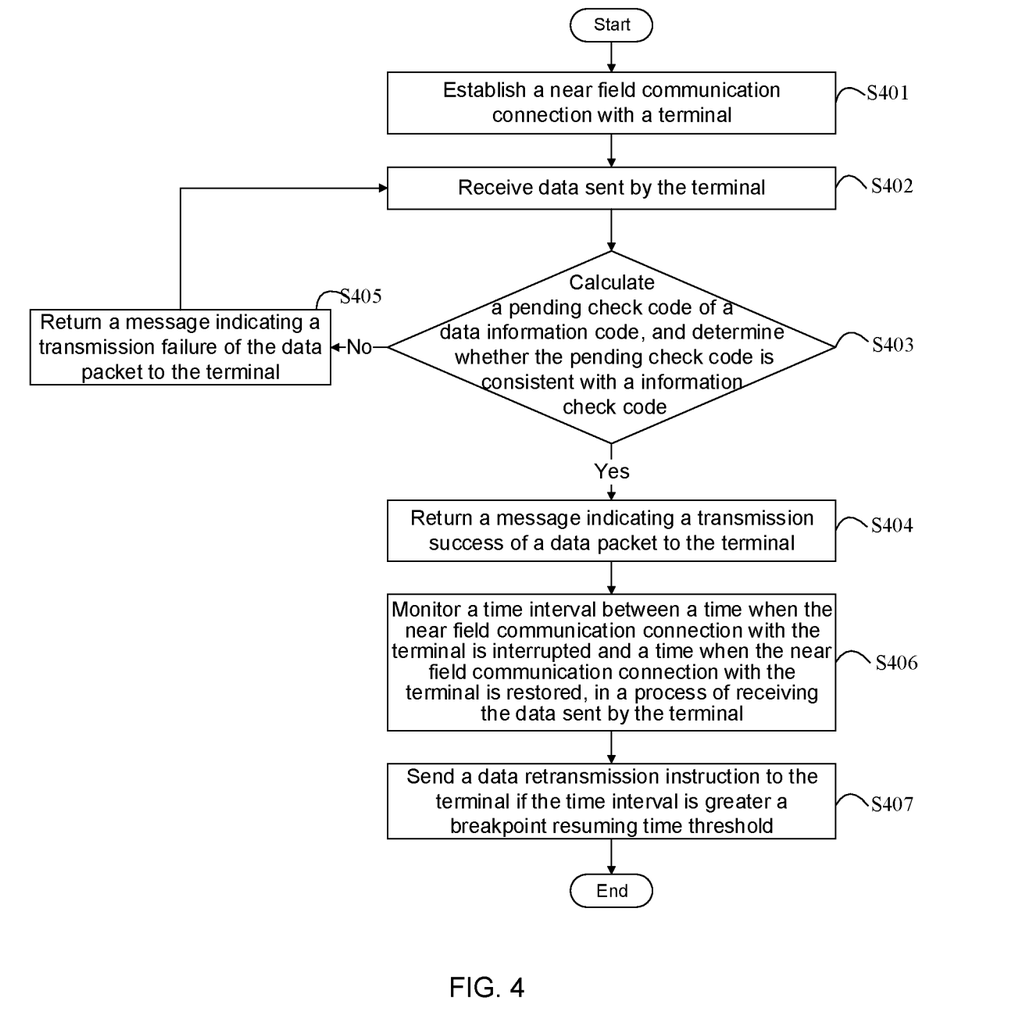
FIG. 4 is a flowchart of still another data transmission method, in accordance with some embodiments.

In S401, a near field communication connection is established with the terminal 10.

In S402, data sent by the terminal 10 is received.

After the near field communication connection between the electronic tag 20 and the terminal 10 is established, the terminal 10 sends the data to the electronic tag 20, and the electronic tag 20 receives the data. The data includes a plurality of data packets. Each data packet includes a data information code and an information check code. The information check code is calculated by the terminal 10 according to the data information code.

It will be noted that, the terminal 10 sends data packets one by one starting from a data packet to be sent first, until all data packets are sent.

In some examples, the terminal takes a data packet with a largest identifier as the data packet to be sent first, and then sends remaining data packets in descending order of identifiers. For example, considering there are a total of ten data packets to be sent, and identifiers thereof are 01 (i.e., a first data packet), 02 (i.e., a second data packet) . . . 10 (i.e., a last data packet), respectively. The terminal takes the data packet identified as "10" as the data packet to be sent first, and sends the data packets identified as 10, 9 . . . 02, 01 one by one. Thus, the data packet identified as "01" is a data packet to be sent last. Before sending a data packet, the terminal calculates the information check code of the data packet, such as a cyclic redundancy check (CRC) value, of the data information code of the date packet, so that the electronic tag may check validity of the data packet after receiving the data information code and the information check code. It will be noted that the terminal may also send the data packets Zo in ascending order or other order of the identifiers, which is not limited in embodiments of the present disclosure.

In addition, each time the terminal 10 starts to transmit data (whether the terminal 10 just starts to transmit data, or starts again to transmit data after an interruption), a total number of data packets of current update data may be sent first, so that the electronic tag 20 may make a comparison in the total number of data packets after all data packets are received.

In S403, a pending check code of the data information code of each data packet is calculated, and it is determined whether the pending check code is consistent with the information check code; if so, S404 is performed; and if not, S405 is performed.

Each time the electronic tag 20 receives a single data packet sent by the terminal 10, the electronic tag 20 calculates a pending check code of a data information code of the data packet (a calculation method may be the same as a calculation method used by the terminal 10). After the pending check code is calculated, the electronic tag 20 determines whether the pending check code is consistent with an information check code of the data packet.

In S404, a message indicating a transmission success of the data packet is returned to the terminal 10.

If the pending check code is consistent with the information check code in the data packet, it is indicated that transmission of the data packet is completed. Then, a message indicating a transmission success of the data packet is returned to the terminal 10. After receiving the message, the terminal 10 continues to send a next data packet.

In S405, a message indicating a transmission failure of the data packet is returned to the terminal 10.

If the pending check code is inconsistent with the information check code of the data packet, it is indicated that the data packet fails to be transmitted. Then, a message indicating a transmission failure of the data packet is returned to the terminal 10. After receiving the message, the terminal 10 resends the data packet.

In S406, in a process that the data sent by the terminal 10 is received, a time interval between a time when the near field communication connection with the terminal 10 is interrupted and a time when the near field communication connection with the terminal 10 is restored is monitored.

In the process of receiving the data sent by the terminal 10, the electronic tag 20 monitors in real time whether the near field communication connection with the terminal 10 is interrupted. If the near field communication connection is interrupted, the electronic tag 20 records an interruption time node to. When the near field communication connection between the electronic tag 20 and the terminal 10 is restored, the electronic tag 20 records a restoration time node $t_1$, and calculates the time interval $\Delta t$ between a time when the near field communication connection with the terminal 10 is interrupted and a time when the near field communication connection with the terminal 10 is restored. The time interval $\Delta t$ satisfies: $\Delta t = t_1 - t_0$.

In S407, if the time interval is greater than or equal to a breakpoint resuming time threshold, a data retransmission instruction is sent to the terminal 10.

If the time interval $\Delta t$ between the time when the near field communication connection between the electronic tag 20 and the terminal 10 is interrupted and the time when the near field communication connection between the electronic tag 20 and the terminal 10 is restored satisfies: $\Delta t = t_1 - t_0 \geq T_{timeout}$ (where $T_{timeout}$ is a preset interval of breakpoint resuming), the electronic tag 20 clears data that have been received, and send the data retransmission instruction to the terminal 10, so that the terminal 10 resends all data packets (i.e., the whole data) starting from a data packet that has been sent first after receiving the data retransmission instruction.

In some embodiments, after receiving all data packets, the electronic tag 20 traverses all data packets to obtain a total number of the all received data packets, and determines whether the total number of the all received data packets is consistent with a total number of the data packets sent by the terminal 10, so as to determine whether the received data is complete.

In the data transmission method provided in some embodiments of the present disclosure, in a case where the interruption duration exceeds the breakpoint resuming time threshold, the electronic tag 20 sends the retransmission instruction to the terminal 10, so that, the terminal 10 resends the data starting from the data packet that has been sent first after receiving the retransmission instruction. In this way, after the data is received, a portion of the data transmitted before the interruption may be effectively prevented from being lost in the electronic tag 20 due to automatic clearing of data that has been received by the processor 21 or other reasons, so that the transmitted data may be ensured to be complete and accurate. In addition, duo to an addition of a check mechanism for each data packet, it may be further possible to effectively ensure integrity and accuracy of data transmission, thereby reducing a risk of the occurrence of garbled characters.

Figure 5:
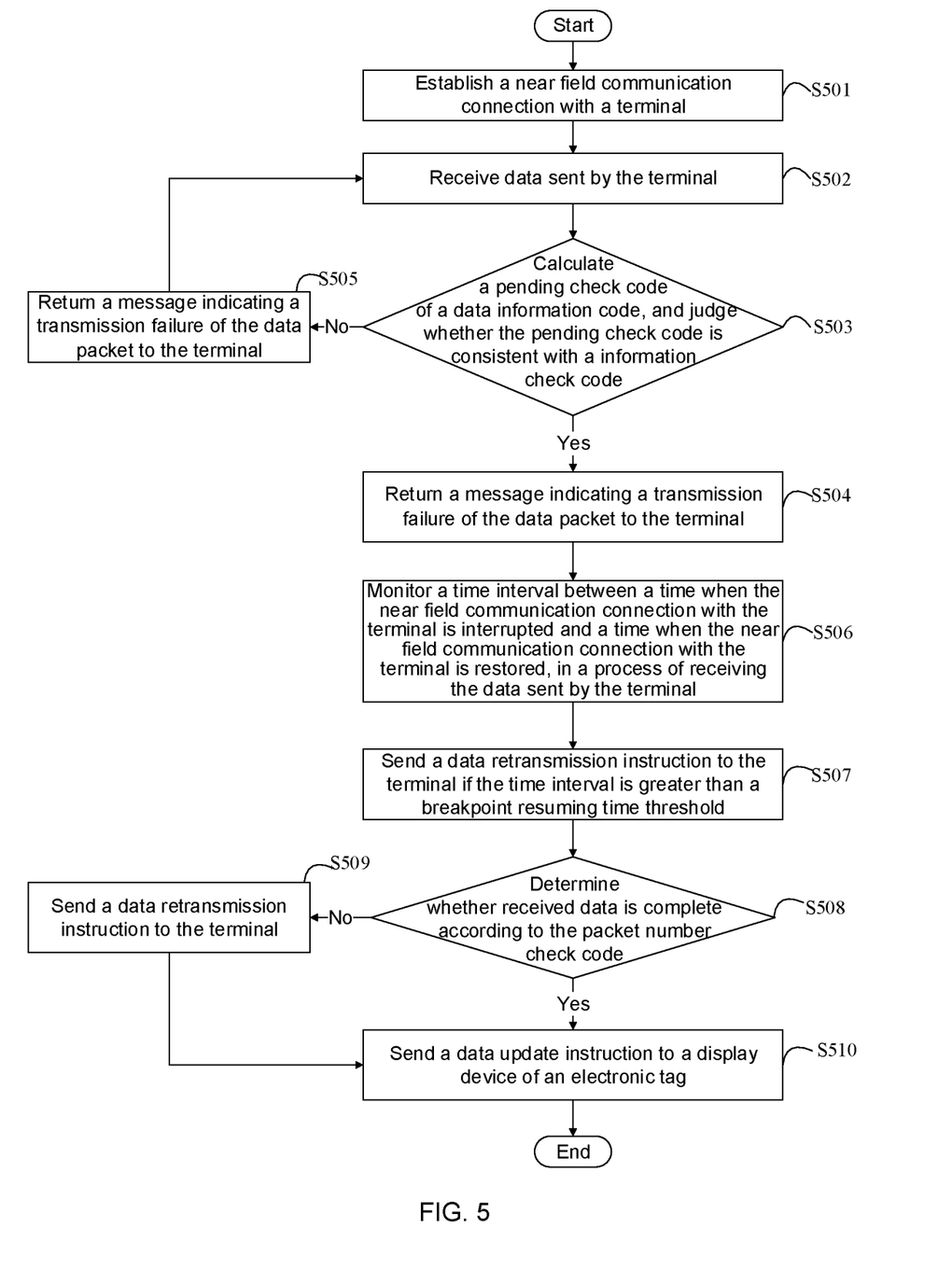
FIG. 5 is a flowchart of still another data transmission method, in accordance with some embodiments.

Some embodiments of the present disclosure provide still another data transmission method. As shown in FIGS. 2 and 5, the data transmission method is applied to the electronic tag 20; and the method includes the following steps 501 to 510 (S501 to S510).

In S501, a near field communication connection is established with the terminal 10.

In S502, data sent by the terminal 10 is received.

After the near field communication connection between the electronic tag 20 and the terminal 10 is established, the terminal 10 sends the data to the electronic tag 20, and the electronic tag 20 receives the data. The data includes a plurality of data packets. Each data packet includes a data information code, an information check code and a packet number check code. The information check code is calculated by the terminal 10 according to the data information code. The information check code may be, for example, a cyclic redundancy check (CRC) value.

In some examples, each data packet is formed by splicing the packet number check code with M-bit, the data information code with K-bit and the information check code with R-bit. The packet number check code may be a total number of data packets or an identifier of the data packet.

In S503, a pending check code of the data information code of each data packet is calculated, and it is determined whether the pending check code is consistent with the information check code; if so, S504 is performed; and if not, S505 is performed.

Each time the electronic tag 20 receives a data packet sent by the terminal 10, the processor 21 calculates a pending check code of a data information code of the data packet (a calculation method may be the same as a calculation method using by the terminal 10), and determines whether the pending check code is consistent with an information check code of the data packet.

In S504, returns a message indicating a transmission success of the packet is returned to the terminal 10.

If the pending check code is consistent with the information check code in the data packet, it is indicated that transmission of the data packet is completed. Then, the message indicating the transmission success of the data packet is returned to the terminal 10. After receiving the message, the terminal 10 sends a next data packet.

In S505, a message indicating a transmission failure of the data packet is returned to the terminal 10.

If the pending check code is not consistent with the information check code of the data packet, it is indicated that the data packet fails to be transmitted. Then, the message indicating the transmission failure of the data packet is returned to the terminal 10. After receiving the message, the terminal 10 resends the data packet.

In S506, in a process that the data sent by the terminal 10 is received, a time interval between a time point when the near field communication connection with the terminal 10 is interrupted and a time when the near field communication connection with the terminal 10 is restored is monitored.

In the process of receiving the data sent by the terminal 10, the electronic tag 20 monitors in real time whether the near field communication connection with the terminal 10 is interrupted. If the near field communication connection is interrupted, the electronic tag 20 records an interruption time node to. When the near field communication connection between the electronic tag 20 and the terminal 10 is restored, the electronic tag 20 records a restoration time node $t_1$, and calculates the time interval $\Delta t$ between the time when the near field communication connection with the terminal 10 is interrupted and the time when the near field communication connection with the terminal 10 is restored. The time interval $\Delta t$ satisfies: $\Delta t = t_1 - t_0$.

In S507, if the time interval is equal to or greater than a breakpoint resuming time threshold, the terminal 10 sends a data retransmission instruction.

If the time interval Δt between the time when the near field communication connection between the electronic tag 20 and the terminal 10 is interrupted and the time when the near field communication connection between the electronic tag 20 and the terminal 10 is restored satisfies: $\Delta t = t_1 - t_0 \geq T_{timeout}$ (where $T_{timeout}$ is a preset interval of breakpoint resuming), the electronic tag 20 sends the data retransmission instruction to the terminal 10, so that the terminal 10 resends data (e.g., the whole data) starting from a data packet that has been sent first after receiving the data retransmission instruction.

In S508, it is determined whether received data is complete according to the packet number check code; if not, S509 is performed; and if so, S510 is performed.

In some examples, the packet number check code is a total number A of the data packets. In this case, a total number B of all received data packets is calculated, and it is determined whether the total number B of the all received data packets is consistent with the total number A of the data packets, so as to determine whether the received data is complete.

In some other examples, the packet number check code is an identifier of the data packet (for example, assuming there are in total ten data packets to be sent which are identified as 01, 02 . . . 10 one by one). In this case, it is determined whether identifiers of received data packets include an identifier of a first data packet or an identifier of a last data packet. If not, it is determined that the received data is incomplete; and if so, it is determined that the received data is complete.

For example, the identifier of the first data packet is "01", and the identifier of the last data packet is "10".

Based on this, if the terminal sequentially sends the data packets in descending order of the identifiers, an identifier of the data packet to be sent first will be "10". In this case, if data packets received by the electronic tag include the identifier "10" of the last data packet, it indicates that the data packet (i.e., a data packet received first by the electronic tag before the interruption) that has been sent first by the terminal is not cleared, or is received again. If the data packets received by the electronic tag include the identifier "01" of the first data packet, it indicates that a data packet that has been Zo sent last by the terminal is received, that is, all data packets sent by the terminal are received by the electronic tag.

For example, in a case where the terminal sends the data packets in descending order of the identifiers, the electronic tag 20 may directly determine whether an identifier of a data packet received last by the electronic tag is the identifier "01" of the first data packet. If the identifier of the data packet received last by the electronic tag is the identifier "01" of the first data packet, it indicates that all data packets sent by the terminal are received by the electronic tag. In this way, it may be possible to speed up a determination of data integrity, reduce time spent in a data transmission process, and thereby improve efficiency of data transmission.

In addition, in some examples, if the packet number check code is an identifier of the data packet, it is also determined whether the identifiers of the received data packets include the identifier "01" of the first data packet and the identifier "10" of the last data packet. If not, it is determined that the received data is incomplete; and if so, it is determined that the received data is complete. For a determination process, reference may be made to the determination process of determining whether the identifiers of the received data packets include the identifier of the first data packet or the identifier of the last data packet described above, which will not be detailed here.

In S509, a data retransmission instruction is sent to the terminal 10.

If the total number of the all data packets received by the electronic tag 20 is inconsistent with the total number of the data packets of the packet number check code, it indicates that data packet(s) are missing. Then, the electronic tag 20 sends the data retransmission instruction to the terminal 10, so that the terminal 10 resends data (e.g., the whole data) starting from a data packet that has been sent first after receiving the data retransmission instruction. Alternatively, if the identifiers of the received data packets do not include "01" (for example, in the case where the terminal sends the data packets in descending order of the identifiers, the identifier of the data packet received last by the electronic tag 20 is not "01"), it indicates that data packet(s) are missing. Then, the electronic tag 20 sends the data retransmission instruction to the terminal 10, so that the terminal 10 resends data (for example, all data) starting from a data packet that has been sent first after receiving the data retransmission instruction.

In S510, a data update instruction is sent to the display device 22 (e.g., the EPD) of the electronic tag 20.

If the total number of the all data packets received by the electronic tag 20 is consistent with the total number of the data packets of the packet number check code, it indicates that the data packets are complete. Then, the data update instruction is sent to the display device 22 of the electronic tag 20. The display device 22 starts to refresh data. Alternatively, if the identifiers of the received data packets include "01" (for example, in the case where the terminal sends the data packets in descending order of the identifiers, the identifier of the data packet received last by the electronic tag 20 is "01"), it indicates that the data packets are complete. Then, the data update instruction is sent to the display device of the electronic tag 20. The display device 22 starts to refresh data.

In some examples, S510 may include: monitoring a voltage of the super capacitor 23 of the electronic tag 20; if the voltage of the super capacitor 23 is greater than or equal to a second voltage threshold (e.g., the second voltage threshold being greater than the first voltage threshold), sending the data update instruction to the display device 22 of the electronic tag 20, so that data is refreshed into the display device 22.

In the data transmission method provided in some embodiments of the present disclosure, in a case where the interruption duration exceeds the breakpoint resuming time threshold, the electronic tag 20 sends the retransmission instruction to the terminal 10, so that the terminal 10 resends the data starting from the data packet that has been sent first after receiving the retransmission instruction. In this way, after the data is received, data packet(s) transmitted before the interruption may be effectively prevented from being lost in the electronic tag 20, so that the transmitted data may be ensured to be complete and accurate. In addition, due to an addition of a check mechanism for each data packet by means of the packet number check code and the information check code, the integrity and accuracy of each data packet may be ensured by using the information code, and integrity of the whole data may be further ensured by using the packet number check code. As a result, such double verification may effectively avoid an occurrence of garbled characters.

In some examples, in a case where the packet number check code is the identifier of the data packet, determining whether the received data is complete according to the packet number check code; if not, sending the data retransmission instruction to the terminal 10 and if so, sending the data update instruction to the display device of the electronic tag 20, includes: traversing identifiers of all received data packets, and determining whether an identifier of a data packet is missing; If so, sending the retransmission instruction carrying the identifier of the missing data packet to the terminal 10; and if not, sending the data update instruction to the display device 22 of the electronic tag 20. In this way, by traversing the identifiers of the data packets, it may be possible to determine whether identifier(s) of data packet(s) are missing. If so, the data retransmission instruction carrying the identifier(s) of the missing data packet(s) are sent to the terminal 10; and the terminal 10 resends the missing data packet(s) after receiving the data retransmission instruction. Herein, there may be a single missing data packet or a plurality of missing data packets.

Figure 6:
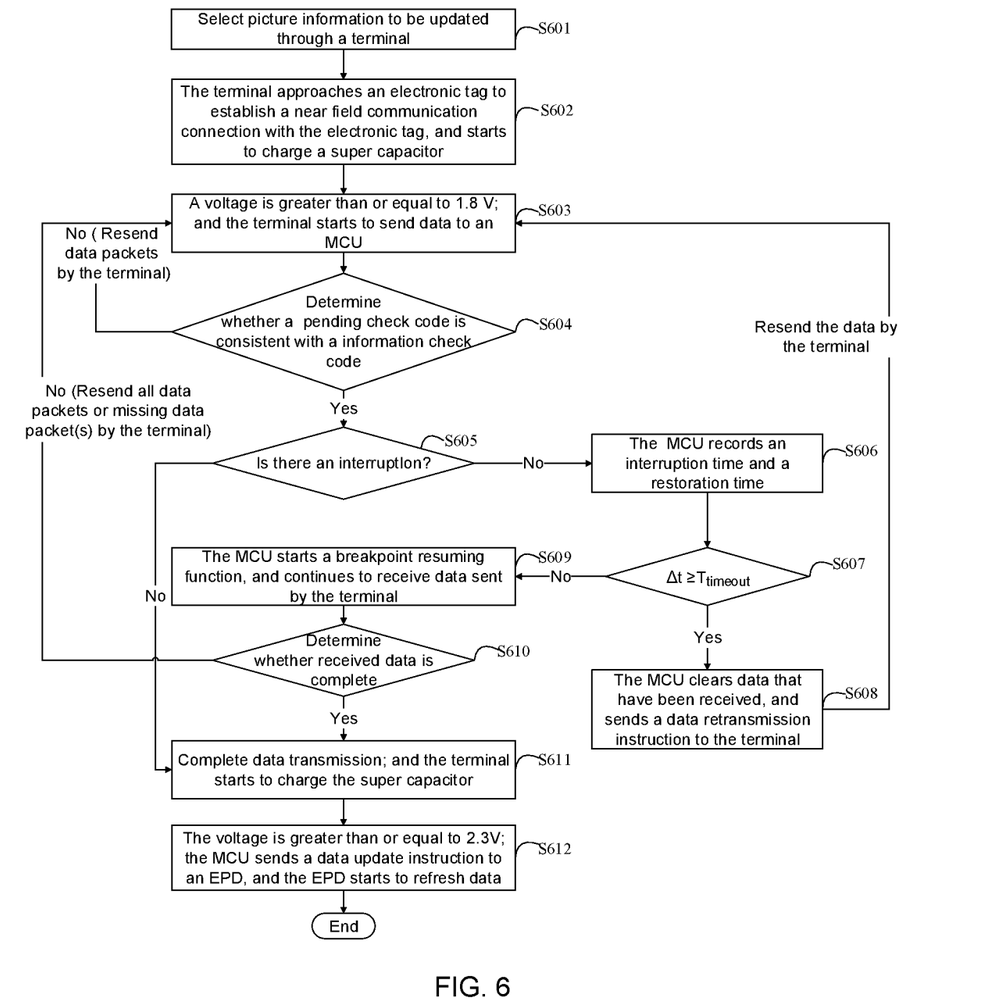
FIG. 6 is a flowchart of still another data transmission method, in accordance with some embodiments.

In some embodiments of the present disclosure, as shown in FIGS. 2 and 6, the data transmission method may include the following steps 601 to 612 (S601 to S612).

In S601, picture information to be updated is selected through the terminal 10.

In S602, the terminal 10 approaches the electronic tag 20 to establish a near field communication connection with the electronic tag 20, and starts to charge the super capacitor 23.

In S603, the super capacitor 23 is charged, and a voltage of the super capacitor 23 is greater than or equal to 1.8 V; and the terminal 10 starts to transmit data to the MCU.

The data includes a plurality of data packets. Each data packet includes a data information code, an information check code and a packet number check code. The information check code (i.e., a cyclic redundancy check (CRC) value) is calculated by the terminal 10 according to the data information code. For example, each data packet is formed by splicing the packet number check code with M-bit, the data information code with K-bit and the information check code with R-bit. The packet number check code may be a total number of the data packets or an identifier of the data packet.

In S604, the MCU calculates a pending check code of the data information code of each data packet, and determines whether the pending check code is consistent with the information check code; if so, the MCU returns a message indicating a transmission success of the data packet to the terminal 10; and if not, the MCU returns a message indicating a transmission failure of the data packet to the terminal 10.

For example, after receiving the message indicating the transmission success of the data packet, the terminal 10 continues to send a next data packet; and after receiving the message indicating the transmission failure of the data packet, the terminal 10 resends the data packet.

In S605, the MCU determines whether the near field communication connection with the terminal 10 is interrupted; if so, S606 is performed; and if not, S611 is performed.

In S606, the MCU records an interruption time node t0; when the near field communication connection between the electronic tag 20 and the terminal 10 is restored, the MCU records a restoration time node and the MCU calculates a time interval Δt between a time when the near field communication connection between the electronic tag 20 and the terminal 10 is interrupted and a time when the near field communication connection between the electronic tag 20 and the terminal 10 is restored. The time interval Δt satisfies: $\Delta t = t_1 - t_0$.

In S607, the MCU determines whether the time interval Δt is greater than $T_{timeout}$ (where $T_{timeout}$ is a preset interval of breakpoint resuming); if so, S608 is performed; and if not, S609 is performed.

In S608, the MCU clears received data that have been received, and sends a data retransmission instruction to the terminal 10.

In S609, the MCU starts a breakpoint resuming function, and continues to receive the data sent by the terminal 10.

In S610, data transmission is completed; and the MCU determines whether the received data is complete according to the packet number check code; if so, S611 is performed; and if not, the MCU sends a data retransmission instruction to the terminal 10, and the terminal 10 resends all data packets or missing data packet(s).

In S611, the terminal 10 continues to charge the super capacitor 23 after confirming that the data transmission has been completed through double verification.

In S612, charging of the super capacitor 23 is completed, and the voltage of the super capacitor 23 is greater than or equal to 2.3 V; the MCU sends a data update instruction to the EPD; and the EPD starts to refresh data.

Figure 7:
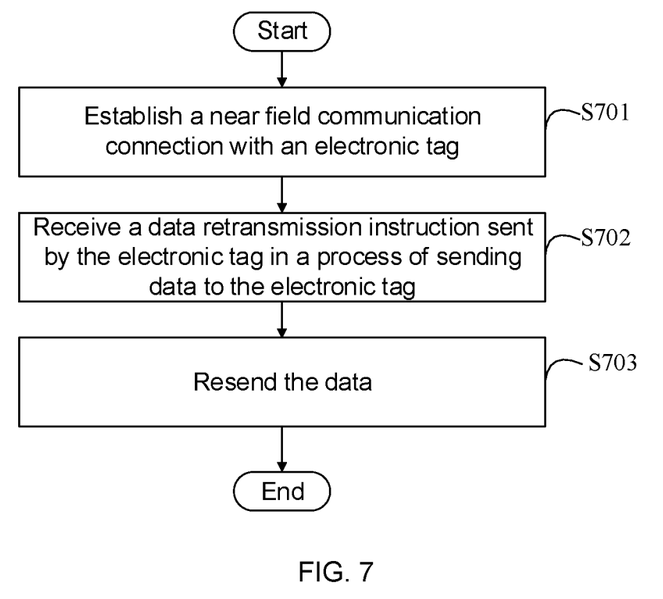
FIG. 7 is a flowchart of still another data transmission method, in accordance with some embodiments.

Some other embodiments of the disclosure provide still another data transmission method. As shown in FIGS. 2 and 7, the data transmission method is applied to the terminal 10; and the method includes the following steps 701 to 703 (S701 to S703).

In S701, a near field communication connection is established with the electronic tag 20.

The terminal 10 has an NFC (near field communication) coil, and the terminal 10 may be a mobile phone or a reader. The terminal 10 establishes the NFC with the electronic tag 20, and then the terminal 10 charges the super capacitor 23 of the electronic tag 20 and transmits data to the processor 21 of the electronic tag 20 though NFC technology.

In S702, in a process that data is sent to the electronic tag 20, a data retransmission instruction sent by the electronic tag 20 is received.

After the near field communication connection is established between the electronic tag 20 and the terminal 10, the terminal 10 sends the data to the electronic tag 20; and the electronic tag 20 monitors in real time whether the near field communication connection with the terminal 10 is interrupted in a process of receiving the data sent by the terminal 10. If the near field communication connection with the terminal 10 is interrupted, the electronic tag 20 records an interrupted time node to; and when the near field communication connection between the electronic tag 20 and the terminal 10 is restored, the electronic tag 20 records a restoration time node $t_1$. The processor 21 calculates a time interval Δt between a time when the near field communication connection with the terminal 10 is interrupted and a time when the near field communication connection with the terminal 10 is restored. The time interval Δt satisfies: $\Delta t = t_1 - t_0$. If the time interval Δt between the time when the near field communication connection between the electronic tag 20 and the terminal 10 is interrupted and the time when the near field communication connection between the electronic tag 20 and the terminal 10 is restored satisfies: $\Delta t = t_1 - t_0 \geq T_{timeout}$ (where $T_{timeout}$ is a preset interval of breakpoint resuming), the processor 21 sends the data retransmission instruction to the terminal 10.

In S703, the data is resent.

After receiving the data retransmission instruction sent by the electronic tag 20, the terminal 10 resends the data.

For example, after receiving the data retransmission instruction sent by the electronic tag 20, the terminal 10 resends data that is sent.

For another example, the terminal 10 resends all data packets (e.g., the whole data) starting from a data packet that has been sent first. The all data packets to be resent include not only the data packet(s) that has been sent, but also data packet(s) that has not been sent before. In this way, it may be possible to effectively ensure that the data received by the terminal 10 is complete.

In some examples, the method further includes: if receiving a message indicating a transmission failure of a data packet returned by the electronic tag 20, parsing the message to obtain an identifier of the data packet failed to be transmitted, and resending the data packet failed to be transmitted; if receiving a transmission success of a data packet returned by the electronic tag 20, parsing the message to obtain an identifier of the data packet that has been transmitted successfully, and sending a next data packet to the electronic tag 20; and if receiving the data retransmission instruction carrying an identifier of a missing data packet sent by the electronic tag 20, parsing the instruction to obtain the identifier of the missing data packet, and sending the missing data packet to the electronic tag 20.

In the data transmission method provided in some embodiments of the present disclosure, in a case where an interruption duration exceeds the breakpoint resuming time threshold, the electronic tag 20 sends the retransmission instruction to the terminal 10, so that the terminal 10 resends the data starting from the data packet that has been sent first after receiving the data retransmission instruction. In this way, after the whole data is received, data packet(s) transmitted before the interruption may be effectively prevented from being lost, which effectively an occurrence of garbled characters.

Figure 8:
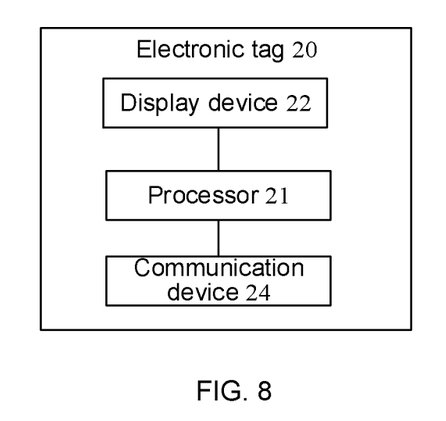
FIG. 8 is schematic block diagram of an electronic tag, in accordance with some embodiments.

Some embodiments of the present disclosure further provide an electronic tag 20. As shown in FIG. 8, the electronic tag 20 includes a display device 22, a communication device 24 and a processor 21. The communication device 24 is configured to establish a near field communication connection with a terminal. The processor 21 is configured to: monitor a time interval between a time when the near field communication connection with the terminal is interrupted and a time when the near field communication connection with the terminal is restored in a process of receiving data sent by the terminal; and send a data retransmission instruction to the terminal if the time interval is greater than or equal to a breakpoint resuming time threshold.

In a case where an interruption duration exceeds the breakpoint resuming time threshold, the electronic tag 20 sends the retransmission instruction to the terminal 10, so that the terminal 10 resends the data starting from a data packet that has been sent first after receiving the data retransmission instruction. In this way, a loss of data packet(s) transmitted before the interruption may be effectively avoided. Therefore, it may be possible to effectively ensure the integrity and accuracy of the transmitted data, which effectively avoids an occurrence of garbled characters in display content of the electronic tag 20.

In some embodiments of the present disclosure, the processor 21 is further configured to: clear a portion of data that has been received from by the terminal so far if the time interval is greater than or equal to the breakpoint resuming time threshold, and send the data retransmission instruction to the terminal so as to instruct the terminal to resend the whole data. In this way, it may be possible to effectively ensure that data received by the electronic tag after the near field communication connection is restored is the whole data, thereby effectively avoiding garbled characters in the display content of the electronic tag.

In some embodiments of the present disclosure, the processor 21 is further configured to: monitor a voltage of a super capacitor of the electronic tag after the near field communication connection with the terminal is established, and send a data transmission instruction to the terminal if the voltage of the super capacitor is greater than or equal to a first voltage threshold. By charging the super capacitor in this way, it may be possible to provide the electronic tag with power, so that a stable progress of data transmission is ensured.

In some embodiments of the present disclosure, the processor 21 is further configured to: receive data sent by the terminal after the near field communication connection with the terminal is established, the data including a plurality of data packets, each data packet including a data information code and an information check code, and the information check code being calculated by the terminal according to the data information code; calculate a pending check code of the data information code of each data packet, and determine whether the pending check code is consistent with the information check code if not, returning a message indicating a transmission failure of the data packet the terminal; and if so, returning a message indicating a transmission success of the data packet to the terminal. By checking each data packet, it may be possible to ensure accuracy and effectiveness of a transmission process of the data packet, thereby effectively avoiding garbled characters in content displayed by the electronic tag due to inaccurate factors such as data information confusion or missing.

In some embodiments of the present disclosure, each data packet further includes a packet number check code. The processor 21 is further configured to: determine whether received data is complete according to the packet number check code after receiving the data sent by the terminal; if not, sending a data retransmission instruction to the terminal; if so, sending a data update instruction to the display device of the electronic tag. In this way, a total number of the data packets may be checked, so that it may be possible to ensure accuracy of a total number of the received data packets, which effectively avoids garbled characters in content displayed by the electronic tag due to inaccurate factors such as data packet missing.

In some embodiments of the present disclosure, the packet number check code includes a total number of the data packets. The processor is further configured to: calculate a total number of all received data packets, and determine whether the total number of the all received data packets is consistent with the total number of the data packets of the packet number check code, so as to determine whether the received data is complete. In this way, it may be possible to determine integrity of the data packets received by the electronic tag accurately, thereby effectively ensuring normal display of the electronic tag.

In some embodiments of the present disclosure, the packet number check code includes an identifier of the single data packet. The processor is further configured to: determine whether an identifier of a data packet received last is an identifier of a first data packet, so as to determine whether the received data is complete. In this way, in a Zo case where the terminal takes a data packet with a largest identifier as a first data packet to be sent, and sends the date packets in descending order of identifiers, it may be possible to determine whether the data packets received by the electronic tag are complete quickly and accurately, thereby effectively ensuring the normal display of the electronic tag.

In some embodiments of the present disclosure, the packet number check code includes an identifier of the data packet. The processor is further configured to: traverse identifiers of all received data packets, and determine whether an identifier of a data packet is missing; if so, sending the data retransmission instruction carrying the identifier of the missing data packet to the terminal; if not, sending a data update instruction to the display device of the electronic tag. In this way, missing data packet(s) may be provided quickly, so that display requirements of the electronic tag may be met quickly and effectively.

In some embodiments of the present disclosure, the processor is further configured to: monitor the voltage of the super capacitor of the electronic tag, and send a data update instruction to the display device of the electronic tag if the voltage of the super capacitor is greater than or equal to a second voltage threshold. In this way, by recharging the super capacitor, the super capacitor may provide power to support normal display of the electronic tag.

Figure 9:
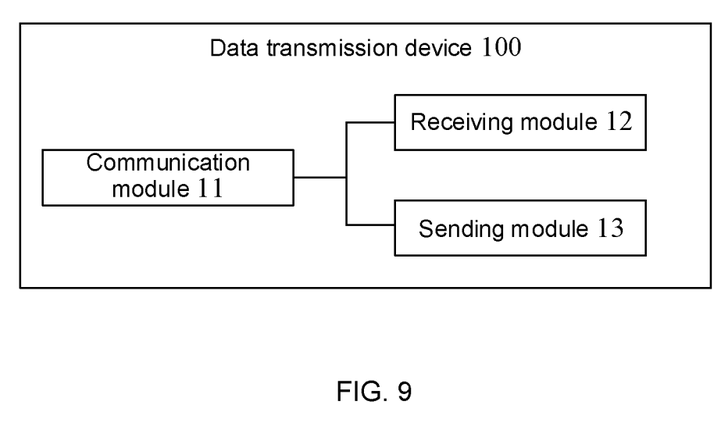
FIG. 9 is schematic block diagram of a data transmission device, in accordance with some embodiments.

Some embodiments of the present disclosure provide a data transmission device disposed in the terminal. As shown in FIG. 9, the data transmission device 100 includes a communication module 11, a receiving module 12 and a sending module 13. The communication module 11 is configured to establish a near field communication connection with an electronic tag. The receiving module 12 is configured to receive a data retransmission instruction sent by the electronic tag. The sending module 13 is Zo configured to resend data. Since the terminal can resend the data, it may be possible to ensure that transmitted data is complete and accurate, thereby effectively avoiding garbled characters in displayed content of the electronic tag.

In some embodiments of the present disclosure, the sending module 13 is further configured to resend data packets starting from a data packet that has been sent first. Since the sending module 13 can resend all the data packets, the normal display of the electronic tag may be realized.

In some embodiments of the present disclosure, the sending module 13 is further configured to:

if receiving a message indicating a transmission failure of a data packet returned by the electronic tag, parse the message to obtain an identifier of the data packet failed to be transmitted, and resend the data packet failed to be transmitted to the electronic tag; and if receiving a message indicating a transmission success of the data packet returned by the electronic tag, parse the message to obtain an identifier of the data packet that has been successfully transmitted, and send a next data packet to the electronic tag. In this way, by checking each data packet, it may be possible to ensure accuracy and effectiveness of a transmission process of the data packet, thereby effectively avoiding garbled characters in the content displayed by the electronic tag due to inaccurate factors such as data information confusion or missing.

Based on this, the sending module 13 may further be configured to: if receiving the data retransmission instruction carrying an identifier of a missing data packet sent by the electronic tag, parse the instruction to obtain the identifier of the missing data packet, and send the missing data packet to the electronic tag. In this way, the missing data packet may be provided quickly, so that display requirements of the electronic tag may be met quickly and effectively.

The devices or modules mentioned in some embodiments described above are used for implementing corresponding methods in some embodiments described above, and have beneficial effects of the embodiments in which the corresponding methods are provided, which will not be detailed here.

Figure 10:
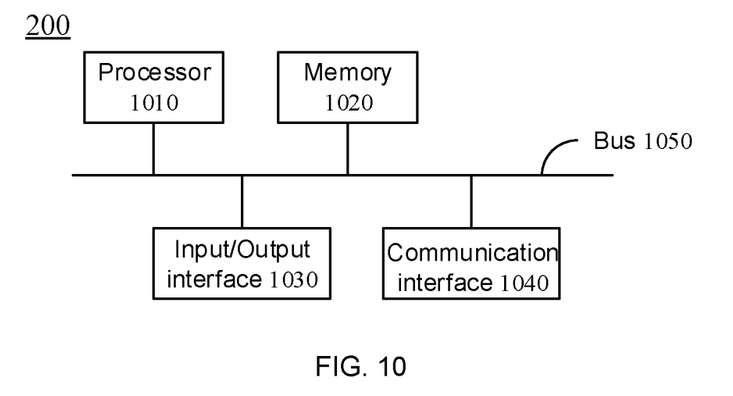
FIG. 10 is a structural diagram of an electronic device, in accordance with some embodiments.

FIG. 10 shows a hardware structural diagram of an electronic device provided in some embodiments of the present disclosure. The electronic device 200 includes a processor 1010, a memory 1020, an input/output interface 1030, a communication interface 1040 and a bus 1050. The processor 1010, the memory 1020, the input/output interface 1030 and the communication interface 1040 are communicatively connected to one another inside the device through the bus 1050. For example, the electronic device 200 may be the electronic tag in any one of the above embodiments, or the terminal in any one of the above embodiments.

The processor 1010 may adopt a universal central processing unit (CPU), a microprocessor, an application specific integrated circuit (ASIC), or one or more integrated circuits. The processor 1010 is used to execute related programs to implement the technical solutions provided in the embodiments of this specification.

The memory 1020 may adopt a read only memory (ROM), a random access memory (RAM), a static storage device or a dynamic storage device. The memory 1020 may store an operating system and other application programs. When the technical solutions provided in the embodiments of the present specification are implemented through software or firmware, related program codes are stored in the memory 1020, and called and executed by the processor 1010.

The input/output interface 1030 is used to connect an input/output module (not shown in the figure) to realize information input and output. The input/output module may be configured in the device as a component, or to be externally connected to a device to provide corresponding functions. An input device may include a keyboard, a mouse, a touch screen, a microphone, various sensors, etc. An output device may include a display, a speaker, a vibrator, an indicator, etc.

The communication interface 1040 is used to connect a communication module (not shown in the figure), so as to realize a communication interaction between the device and other devices. The communication module may implement communication through wired means (e.g., through USB, network cable, etc.), or wireless means (e.g., through mobile network, WIFI, Bluetooth, etc.). The communication module may also implement communication through near field communication.

The bus 1050 includes at least one path, which can transmit information between various components of the device (e.g., the processor 1010, the memory 1020, the input/output interface 1030 and communication interface 1040).

It will be noted that although only the processor 1010, the memory 1020, the input/output interface 1030, the communication interface 1040 and the bus 1050 of the device are shown, in a specific implementation process, the device may further include other necessary components for normal operation. In addition, those skilled in the art will understand that the above device may also only include components necessary to implement the solutions of some embodiments of the present specification, but does not necessarily include all the components shown in the figures.

A computer-readable medium of the embodiments includes a permanent computer-readable medium, a nonpermanent computer-readable medium, a removable media and a non-removable media, which may implement information storage in any method or by any technology. The information may be computer-readable instructions, data structures, program modules or other data. The computer storage medium includes but is not limited to a phase change memory (PRAM), a static random access memory (SRAM), a dynamic random access memory (DRAM) or other types of random access memory (RAM), a read-only memory (ROM), electrically erasable programmable read-only memory (EEPROM), a flash memory or other memory, a compact disc read-only memory (CD-ROM), a digital versatile disc (DVD) or other optical storage, magnetic tape cartridges, tape disk storage or other magnetic storage devices or any other non-transmission media, which may be used to store information that may be accessed by a computing device.

Some embodiments of the present disclosure provide a computer program product. The computer program product includes computer program instructions. When executed on a computer, the computer program instructions cause the computer to perform the data transmission method in the above embodiments.

Some embodiments of the present disclosure provide a computer program. When executed on the computer, the computer program causes the computer to perform of the data transmission methods in the above embodiments.

Beneficial effects of the computer-readable storage medium, the computer program product and the computer program are the same as beneficial effects of the data transmission methods described in some embodiments described above, which will not be detailed here.

In addition, those skilled in the art will understand that, the discussion of any of the above embodiments is merely exemplary, but is not intended to imply that the scope of the disclosure (including the claims) is limited to these examples. Within the idea of the present disclosure, technical features in the above embodiments or different embodiments may also be combined with one another. In addition, there are many other variations in different aspects of the present disclosure as described above, which are not provided in details for the sake of brevity.

In addition, in order to simplify the description and discussion, and not to obscure the present disclosure, well-known power/ground connections to integrated circuit (IC) chips and other components may or may not be shown in the provided accompanying drawings. In addition, the device may be shown in a block diagram to avoid obscuring the present disclosure. The fact is also taken into account that, details of an implementation of these devices shown in a block diagram are highly dependent on scenes in which the present disclosure will be implemented (that is, these details should be completely within an understanding of those skilled in the art). In a case where specific details (e.g., circuits) are illustrated to describe exemplary embodiments of the present disclosure, it will be apparent to those skilled in the art that the present disclosure may also be implemented without these specific details or with variations of these specific details. Therefore, these descriptions should be considered as illustrative instead of restrictive.

Although the present disclosure has been described in combination with specific embodiments thereof, many alternatives, modifications, and variations of these embodiments will be apparent to those skilled in the art according to the foregoing description. For example, other memory architectures (e.g., a dynamic random access memory (DRAM)) may use the above described embodiments.

The foregoing descriptions are merely specific implementations of the present disclosure. However, the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A data transmission method applied to an electronic tag, the method comprising:
   establishing a near field communication connection with a terminal;
   monitoring a time interval between a time when the near field communication connection with the terminal is interrupted and a time when the near field communication connection with the terminal is restored in a process of receiving data sent by the terminal; and
   if the time interval is greater than or equal to a breakpoint resuming time threshold, sending a data retransmission instruction to the terminal; and
   after establishing the near field communication connection with the terminal, the method further comprising:
   monitoring a voltage of a super capacitor of the electronic tag; and
   if the voltage of the super capacitor is greater than or equal to a first voltage threshold, sending a data transmission instruction to the terminal.

2. The data transmission method according to claim 1, wherein, if the time interval is greater than or equal to the breakpoint resuming time threshold, sending the data retransmission instruction to the terminal, includes:
   if the time interval is greater than or equal to the breakpoint resuming time threshold, clearing a portion, having been received so far, of the data from the terminal, and
   sending the data retransmission instruction to the terminal to instruct the terminal to resend the whole data.

3. The data transmission method according to claim 1, wherein, after establishing the near field communication connection with the terminal, the method further comprises:
   receiving the data sent by the terminal; wherein the data includes a plurality of data packets, each data packet includes a data information code and an information check code, and the information check code is calculated by the terminal according to the data information code;
   calculating a pending check code corresponding to the data information code of each data packet, and
   determining whether the pending check code is consistent with the information check code;
   if not, returning a message indicating a transmission failure of the data packet to the terminal; and
   if so, return a message indicating a transmission success of the data packet to the terminal.

4. The data transmission method according to claim 3, wherein each data packet further includes a packet number check code; and
   after receiving the data sent by the terminal, the method further comprises:
   determining whether the received data is complete according to the packet number check code;
   if not, sending the data retransmission instruction to the terminal; and
   if so, sending a data update instruction to a display device of the electronic tag.

5. The data transmission method according to claim 4, wherein the packet number check code includes a total number of the data packets; and
determining whether the received data is complete according to the packet number check code, includes:
calculating a total number of all received data pockets;
determining whether the total number of the all received data is consistent with the total number of the data packets of the packet number check code;
if not, determining that the received data is incomplete; and
if so, determining that the received data is complete.

6. The data transmission method according to claim 4, wherein the packet number check code includes an identifier of the data packet; and
determining whether the received data is complete according to the packet number check code, includes:
determining whether identifiers of received data packets include an identifier of at least one of a first data packet or a last data packet;
if the identifiers of the received data packets do not include the identifier of the at least one of the first data packet or the last data packet, determining that the received data is incomplete; and
if the identifiers of the received data packets include the identifier of the at least one of the first data packet or the last data packet, determining that the received data is complete.

7. The data transmission method according to claim 6, wherein, determining whether the identifiers of the received data packets include the identifier of the first data packet and/or the identifier of the last data packet; if not, determining that the received data is incomplete; and if so, determining that the received data is complete, includes:
determining whether an identifier of a data packet received last is the identifier of the first data packet;
if not, determining that the received data is incomplete; and
if so, determining that the received data is complete.

8. The data transmission method according to claim 4, wherein the packet number check code includes an identifier of the data packet; and
determining whether the received data is complete according to the packet number check code; if not, sending the data retransmission instruction to the terminal; and if so, sending the data update instruction to the display device of the electronic tag, includes:
traversing identifiers of all received data packets to determine whether an identifier of a data packet is missing;
if not, sending the data update instruction to the display device of the electronic tag; and
if so, sending the data retransmission instruction carrying the identifier of the missing data packet to the terminal.

9. The data transmission method according to claim 4, wherein, sending the data update instruction to the display device of the electronic tag, includes:
monitoring an voltage of a super capacitor of the electronic tag; and
if the voltage of the super capacitor is greater than or equal to a second voltage threshold, sending the data update instruction to the display device of the electronic tag.

10. The data transmission method according to claim 1, wherein, after establishing the near field communication connection with the terminal, the method further comprises:
receiving the data sent by the terminal; wherein the data includes a plurality of data packets, each data packet includes a packet number check code; and
determining whether the received data is complete according to the packet number check code;
if not, sending the data retransmission instruction to the terminal; and
if so, sending a data update instruction to a display device of the electronic tag.

11. An electronic device, comprising a memory, a processor and a computer program stored on the memory and executable on the processor, wherein the method according to claim 1 is implemented when the program is executed by the processor.

12. A non-transitory computer-readable storage medium, having stored computer program instructions that, when executed by a processor, cause the processor to perform the method according to claim 1.

13. An electronic tag, comprising a display device, a communication device and a processor, wherein
the communication device is configured to establish a near field communication connection with a terminal;
the processor is configured to: monitor a time interval between a time when the near field communication connection with the terminal is interrupted and a time when the near field communication connection with the terminal is restored in a process of receiving data sent by the terminal, and send a data retransmission instruction to the terminal if the time interval is greater than or equal to a breakpoint resuming time threshold; and
the processor is further configured to: monitor a voltage of a super capacitor of the electronic tag after the near field communication connection with the terminal is established, and send a data transmission instruction to the terminal if the voltage of the super capacitor is greater than or equal to a first voltage threshold.

* * * * *